Patented June 13, 1939

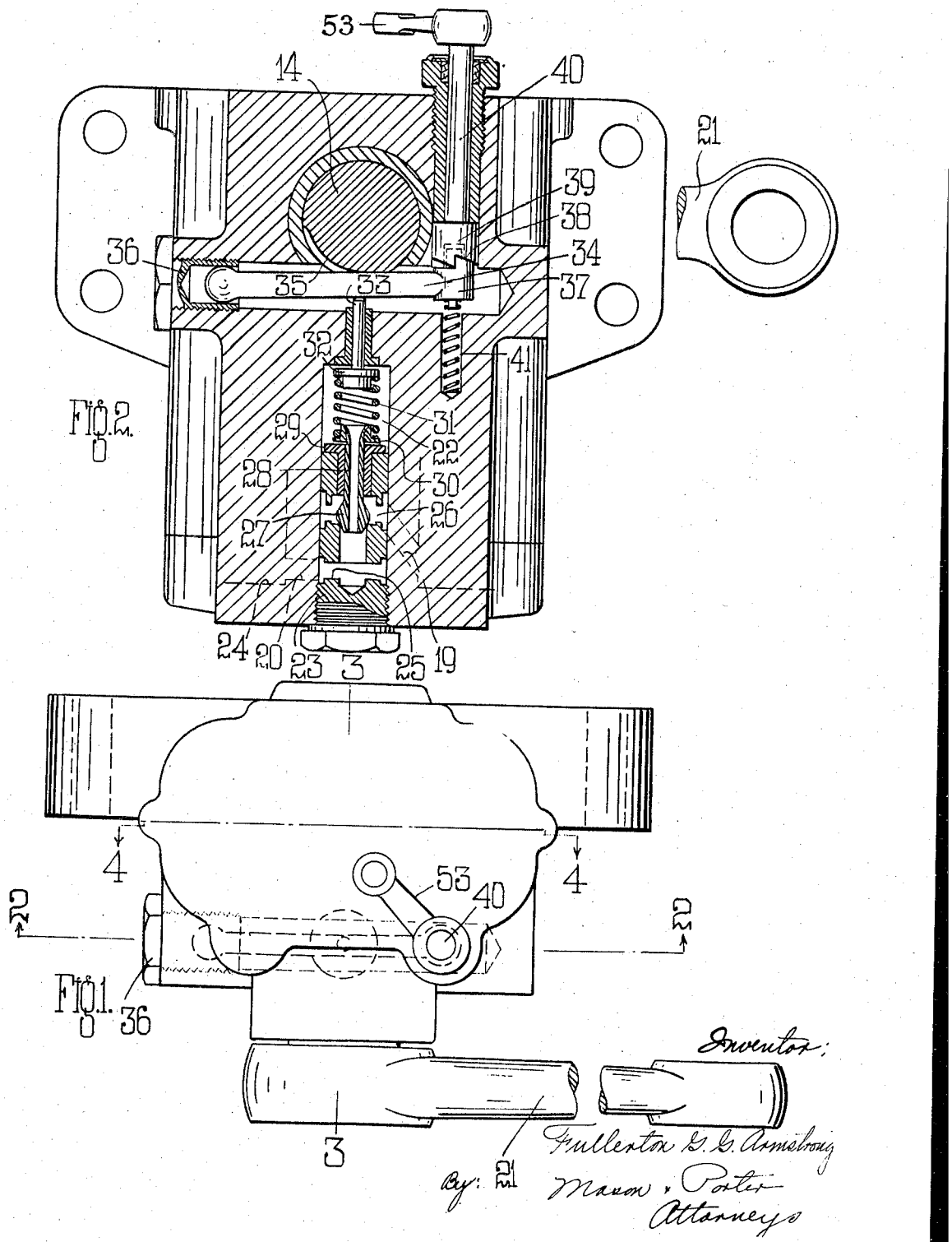

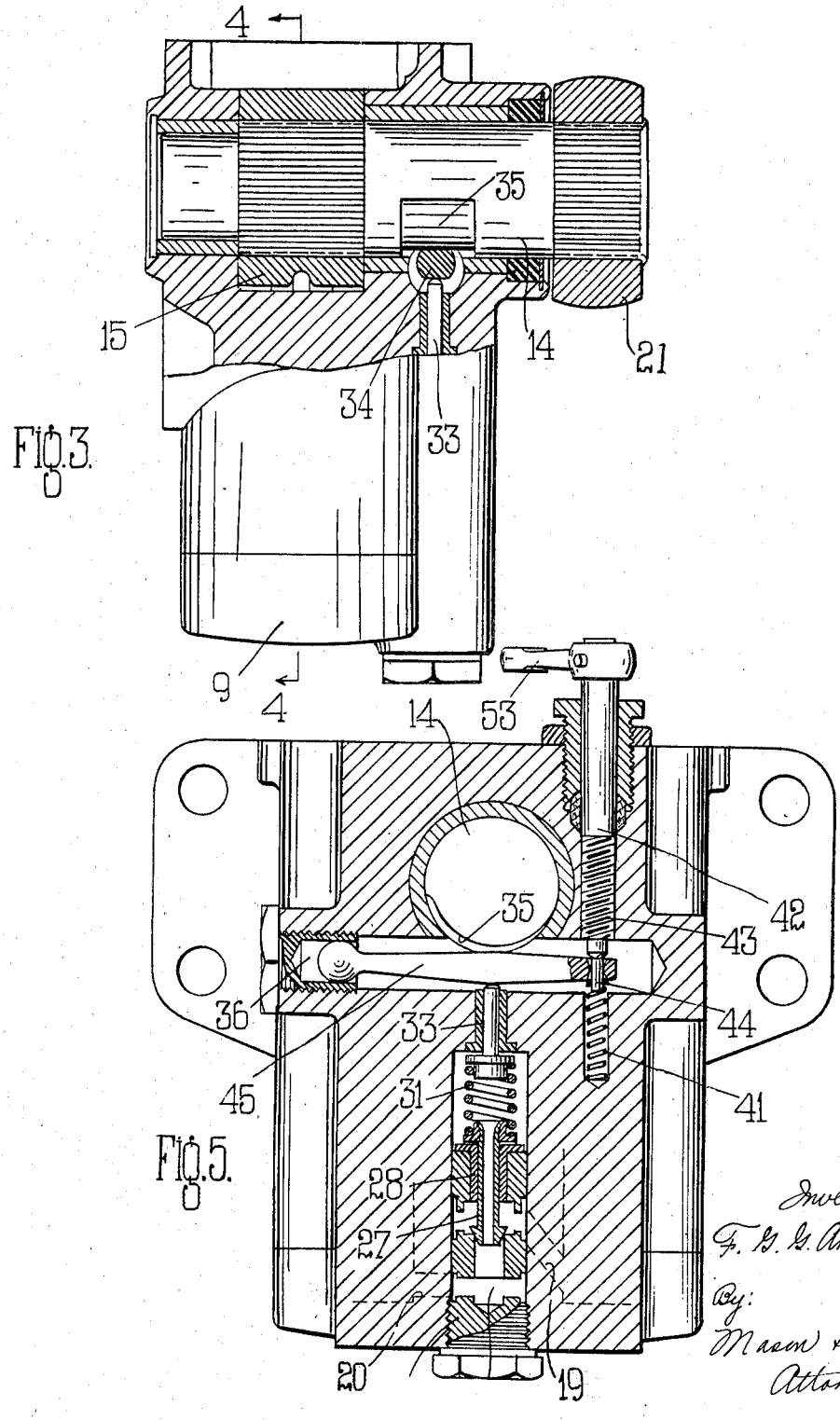

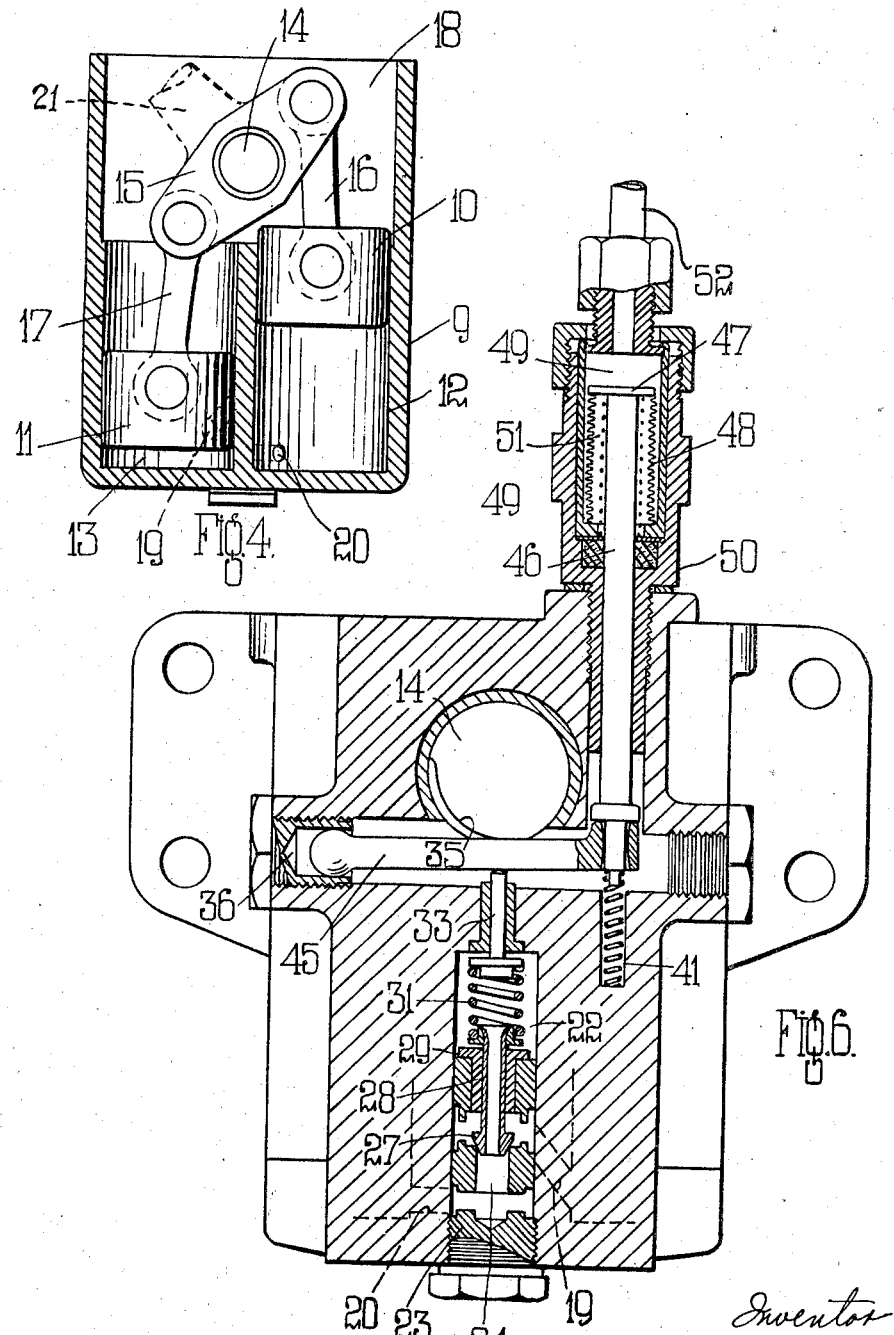

2,162,292

UNITED STATES PATENT OFFICE 2,162,292

HYDRAULIC SHOCK ABSORBER OR THE LIKE DAMPING MEANS

Fullerton George Gordon Armstrong, Beverley, East Yorkshire, England, assignor to The Armstrong's Patents Co. Ltd., Beverley, East Yorkshire, England, a British company Application May 17, 1938, Serial No. 208,484
In Great Britain May 22, 1937

11 Claims. (Cl. 188—88)

The present invention relates to hydraulic shock absorbers and the like differential pressure operated damping means, wherein one or more restricted passages form a resistance to fluid flow in both directions between a pair of piston chambers such as, for example, between the ends of a cylinder in which a double acting piston operates, or again, between a pair of cylinders in each of which a piston is displaceable on operation of the shock absorber or further, in the rotary or vane type of shock absorber.

The object of the present invention is to provide a simple form of valve mechanism for varying the cross sectional area of said restricted passage or passages and further to provide a convenient form of control for said valve mechanism.

According to the present invention a pair of resiliently loaded hollow co-axial valves are provided in a bore of the casing of the shock absorber or the like damping means to regulate fluid flow between the chambers, said resilient load on said valves being common to means for varying it in accordance with piston displacement and also to a remote control for adjusting it separately.

In other words, part of the mechanism for loading the valves to resist displacement in the opening direction thereof is common to and is variable by, at least two controls, one of which is remotely situated, for example in the region of the dash board or the driver's seat in the case of shock absorbers used on vehicles, and the other of which is increased by a relatively large amount on lengthy displacement of the pistons, and by a relatively small amount on relatively short displacement of the pistons so that the resistance to fluid flow is greater when the shock absorber is called upon to resist a violent impact than when it is required to resist a slight impact or relative displacement of the parts to be damped.

The invention is more particularly described with reference to the accompanying drawings, in which:

Figure 1 is a plan view of one form of shock absorber or the like damping means of the present invention.

Figure 2 is a section on the line 2—2 of Figure 1.

Figure 3 is a section on the line 3—3 of Figure 1.

Figure 4 is a diagrammatic section on the lines 4—4 of Figures 1 and 3.

Figure 5 is a longitudinal section through a modified form of construction.

Figure 6 is a longitudinal section through a still further modified form of construction.

In the construction according to Figures 1–4 a pair of pistons 10, 11, are displaceable within chambers 12, 13, of a shock absorber casing 9 on the rotation of a shaft 14 to which a crank 15 is rigidly connected. The crank 15 is connected to the pistons 10, 11, through pivotal rods 16, 17, respectively, from which it will be seen that the extent of longitudinal displacement of the pistons within their chambers depends upon the degree of angular displacement of the shaft 14 about its own axis. This in turn depends upon the relative displacement of the parts which the shock absorber is required to damp, such as for example, a vehicle chassis to which the casing 9 may be connected and a vehicle wheel to which a lever arm 21 rotatable with the shaft 14 may be connected through link mechanism (not shown).

The chambers 12, 13, merge into a common reservoir 18 located above the pistons, whilst the piston swept volumes of the chambers are in intercommunication with a bore 22 in the casing through ducts 19, 20 respectively.

A cap 23 axially bored at 24 over a considerable portion of its length is adapted for screw threaded engagement with the bore 22 so as to be adjustable externally of the shock absorber whilst radially extending conduits 25, 26, are provided in the cap for intercommunication respectively between the bore 24 and the passage 20 and the bore 24 and the passage 19 so as to enable fluid on the compression stroke of one piston to flow out of its chamber into the chamber of the other piston.

The control of this fluid flow is provided by a pair of co-axial hollow valves 27, 28. The head of the valve 27 is adapted for engagement with a seating formed by an intermediate portion of the cap 23 in the region of an annulus forming the duct 26 between the bore 22 and the passage 19, whilst the stem of such hollow valve is surrounded by the second valve 28 which is in the form of a sleeve enclosed within the inner end of the cap 23, the inner end of the sleeve being flanged at 29.

As will be observed from Figure 2 of the drawings, the head of the valve 27 is of double conical form whilst the opposite end of the stem of said valve is flanged at 30 to lie above the flanged end 29 of the sleeve valve 28. The flanged end 30 is adapted to receive one end of a coiled spring 31, the other end of which abuts against the flanged end 32 of a pin 33, the upper end of which abuts against a pivotal lever 34. As shown in the accompanying drawings, a space is provided and suitably maintained between the adjacent surfaces of the flanges 29, 30 on the valves 28, 27, respectvely, to provide for effective differential end areas on valve 27.

This pivotal lever 34 intermediate its ends is engaged by a cam face 35 of the shaft 14 so that on rotation of the shaft it is angularly displaced about its pivot 36, adjustably secured in position to the shock absorber casing, to vary the pressure on the spring 31 and thus vary the load on both valves 27, 28, against movement in the opening direction thereof.

Preferably the pivotal end of the lever 34 is formed substantially spherical so that it has a universal pivotal connection with the shock absorber casing. The opposite end of the lever has a head 37 with a cam face 38 thereon which is engaged by a complementary cam face of a head 39 of a spindle 40 which projects beyond the shock absorber casing and is rotatable by a lever 53 adapted for connection through a Bowden wire for example, to a remote control, which in the case of road vehicles, may be situated in the region of the dash board or the driver's seat.

It will be appreciated that on operation of the remote control the lever 53 is angularly displaced to rotate the spindle 40 about its own axis and thus displace the head 37 of the lever longitudinally of the spindle 40 to displace said lever angularly about its pivot 36 whereby again the load on the spring 31 resisting opening movement of the valves is varied.

It will be appreciated that in the event of actuation of the remote control to depress the lever 34 and the spring 31 in accordance with the load of a vehicle to which the shock absorber is fixed, the shaft 14 may rotate over a portion of its range of displacement without affecting the setting of the lever as such displacement by the remote control may bring the lever out of engagement with the cam face 35 until such time as the shaft has reached a predetermined degree of rotation on displacement of the pistons. Any further rotation of the shaft above the setting determined by the remote control accordingly will further compress the spring 31 and increase the load resisting further opening movement of the valves.

The lever 34 is normally held against the cam face 35 or with its head 37 against the head 39 by means of a spring 41 located in a small bore substantially co-axial of the spindle 40.

In the modified form of construction illustrated in Figure 5 a spindle 42 having a quick thread over a portion of its length at 43 and a free end of relatively narrow diameter as shown at 44 is adapted for engagement with the free end of a modified form of pivotal lever 45, the end 44 passing through a transverse bore in the free end of the lever 45.

In this construction on rotation of the spindle 42 by actuation of the remote control the spindle itself by virtue of its quick thread 43 is longitudinally displaceable within the shock absorber casing to displace the lever 45 angularly about its pivot 36 and thus adjust the load on the valves created by the spring 31.

In the still further modified form of construction illustrated in Figure 6 the spindles 40, 42, are replaced by a spindle 46 the flanged end 47 of which forms the upper end of a bellows 48 housed within a chamber 49 secured by a union 50 to the shock absorber casing.

The bellows is internally provided with a spring 51 whilst the upper end of the chamber 49 is adapted to receive liquid through a pipe 52 from any source of supply remotely controlled, the arrangement being such that on actuation of the remote control and the creation of a pressure in the pipe line 52 the bellows is depressed to cause descent of the spindle 46 which in turn effects angular displacement of the lever 45 to increase the load created by the spring 31 on the valves 27, 28.

In other words, the construction according to Figure 6 differs from that according to the remaining figures in that a hydraulic remotely controlled means is provided as one of the means for adjusting the load resisting opening movement of the valves, this hydraulically operated remote control taking the place of the spindle 40 of the construction according to Figure 2 and the spindle 42 having the quick thread 43 which is illustrated in Figure 5.

In operation, during the compression stroke of the piston 10 in its chamber 12, oil or other liquid or fluid is forced out of the piston chamber 12 into the passage 20, the bore 25 and thence into the bore 22 which is already full of liquid. As a result the valve 27 is raised off its seat against the set load created by the spindles 40, 42, or 46 as the case may be, and the variable load created by the rotation of the shaft 14, whereupon said oil passes through the passage 19 and thence into the other piston chamber 13.

It will be appreciated that the load on the spring 31 may also be increased by increasing the degree of insertion of the cap 23 into the bore 22, this load, like the load created by the spindles 40, 42, or 46 being fixed but adjustable externally of the shock absorber. On movement in the reverse direction of the pistons 10, 11, oil is caused to flow outwardly from the chamber 13 through the passage 19 into the bore 22 to lift the sleeve valve 28 and thus carry with it the valve 27 against the load created by the spring 31 whereupon said oil passes into the bore 24 of the cap and thence through the passages 25, 20, into the chamber 12.

It will thus be seen that the resistance to fluid flow between the piston chambers in either direction depends upon the setting of the valves which if desired in turn depends upon three factors, namely pre-adjustment of the valve seat formed by the cap 23, voluntary adjustment from the remote control and thirdly an automatic adjustment in accordance with displacement of the shock absorber pistons and the shaft 14.

I declare that what I claim is:

1. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of chambers within which said pistons operate, a pair of conduits between said chambers and said bore, a hollow valve member having a head and stem located in said casing bore for regulating fluid flow in one direction between said piston chambers, a sleeve valve surrounding said hollow valve for regulating fluid flow in the opposite direction between said piston chambers and operably connected to the stem of said hollow valve at that end remote from the valve head, resilient means for resisting movement of said valves in the opening direction and at least two independent means, one of which is under the control of said cam face for adjusting the load created by said resilient means.

2. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of chambers within which said pistons operate, a pin longitudinally displaceable within a bore of said casing under the control of said cam face, a pair of conduits between said chambers and said bore, a pair of hollow co-axial valve members for regulating fluid flow between said chambers on displacement of said pistons, and resilient means between said pin and said co-axial valves for resisting movement of said valves in their opening direction.

3. A differential pressure operated damping means comprising a bored casing adapted to be connected to one of a pair of elements whose relative displacement is to be damped, a shaft connected to the other element of said pair and having a cam face, a pair of pistons longitudinally displaceable in opposite directions in accordance with angular displacement of said shaft, a pair of chambers within which said pistons operate, a pair of conduits between said chambers and said bore, a pair of valves each adapted to regulate fluid flow in one direction only between said piston chambers, resiliently loaded means between said cam face and said valves for resisting opening displacement of said valves, and remotely controlled adjustment means for effecting adjustment of said resiliently loaded means independently of said cam face over at least a portion of the range of displacement of said cam face.

4. A differential pressure operated damping means according to claim 2 and including the provision of remotely controlled adjustment means for varying the load on said resilient means independently of the cam face on said shaft.

5. A differential pressure operated damping means according to claim 2 and including the provision of remotely controlled adjustment means for varying the load on said resilient means independently of the cam face on said shaft, and an externally adjustable threaded cap constituting a seating for one of said valves for adjusting the load created by said resilient means independently of said remote control and said cam faced shaft.

6. A differential pressure operated damping means according to claim 1 and including a valve seating for said hollow valve and means for adjusting the position of said valve seating, said means being operable externally of said casing.

7. A differential pressure operated damping means according to claim 1 and including a pivotal lever, a pin and a coiled spring located between the cam face and the valves, which lever, pin and spring, are common to a pair of independent means, one of which comprises said cam face on said shaft and the other comprises a remotely controlled means for separately displacing said lever independently of said cam face.

8. A differential pressure operated damping means comprising a bored casing adapted to be connected to one of a pair of elements whose relative displacement is to be damped, a shaft connected to the other element of said pair, a pair of pistons longitudinally displaceable in opposite directions in accordance with angular displacement of said shaft, a pair of chambers within which said pistons operate, a pair of conduits between said chambers and said bore, a pair of hollow co-axial valves for regulating fluid flow between said chambers, a pivotal lever, a pin engaging at one end with said lever, resilient means between the other end of said pin and said valves, a cam face on said shaft for varying the load created by said springs on said valves to vary the resistance to opening displacement of said valves, and a remotely controlled adjustment means for adjusting said lever independently of said cam face over at least a part of the range of movement of said cam face.

9. A differential pressure operated damping means according to claim 8 and wherein said remotely controlled adjustment means includes a spindle having a quick thread, one end of which engages with said pivotal lever.

10. A differential pressure operated damping means according to claim 8 and wherein said remotely controlled adjustment means includes a plunger and a hydraulic control therefor, one end of said plunger engaging with the free end of said pivotal lever.

11. A differential pressure operated damping means as claimed in claim 8 and wherein said remotely controlled adjustment means includes a bellows, a spindle carried by one end of said bellows, a variable hydraulic load on said bellows in accordance with actuation of said remote control and a light spring situated internally of said bellows for resisting compressive movement thereof, the end of said spindle projecting through said bellows being adapted for engagement with the free end of said pivotal lever to vary the resilient load resisting opening movement of said valves.

FULLERTON GEORGE
GORDON ARMSTRONG.